(12) United States Patent
Laval (10) Patent No.: US 6,652,032 B2
(45) Date of Patent: Nov. 25, 2003

(54) ADJUSTABLE ARMREST

(75) Inventor: Christine Laval, Paris (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/070,765

(22) PCT Filed: May 23, 2001

(86) PCT No.: PCT/EP01/05958
§ 371 (c)(1),
(2), (4) Date: Jul. 30, 2002

(87) PCT Pub. No.: WO01/92054
PCT Pub. Date: Dec. 6, 2001

(65) Prior Publication Data
US 2003/0020315 A1 Jan. 30, 2003

(30) Foreign Application Priority Data
May 31, 2000 (FR) .............................. 00 07047

(51) Int. Cl.[7] ................................................ A47C 7/54
(52) U.S. Cl. .............................. 297/411.32; 297/411.35; 297/411.38
(58) Field of Search .......................... 297/411.2, 411.3, 297/411.32, 411.35, 411.38

(56) References Cited

U.S. PATENT DOCUMENTS

| 4,040,665 A | | 8/1977 | Wallace et al. |
|---|---|---|---|
| 4,310,196 A | * | 1/1982 | Vogel |
| 4,496,190 A | * | 1/1985 | Barley |
| 4,577,905 A | * | 3/1986 | Grant |
| 4,953,259 A | | 9/1990 | Frye et al. |
| 5,984,416 A | * | 11/1999 | Waldo et al. |
| 6,203,101 B1 | * | 3/2001 | Chou et al. |

FOREIGN PATENT DOCUMENTS

| DE | 197 04 469 A | 7/1998 |
|---|---|---|
| EP | 0 296 939 A | 12/1988 |
| EP | 0 571 333 A | 11/1993 |

* cited by examiner

Primary Examiner—Laurie K. Cranmer
(74) Attorney, Agent, or Firm—Brinks Hofer Gilson & Lione (57) ABSTRACT

The invention relates to a folding armrest, in particular for a motor vehicle, of the type that hinges via one of its ends about a hinge (2) between at least two positions, one of these being a substantially horizontal lower operational position H, and the other a substantially vertical upper folded position V, in order to be held therein by locking means.

According to the invention, said locking means are constituted by indexing means (3) integral with one of the fixed or mobile parts of the hinge, in permanent elastic contact with the other part, said other part having at least two notches, designed to co-operate with said indexing means so as to give the armrest (1) at least two stable end positions, an upper one V and a lower one H, which can be taken up or left automatically simply by operating said armrest, depending on a predetermined force F exerted by a user.

10 Claims, 8 Drawing Sheets

# ADJUSTABLE ARMREST

FIELD OF THE INVENTION

The present invention relates to a folding armrest, in particular for a motor vehicle, of the type that is movable by one of its ends about a hinge.

BACKGROUND OF THE INVENTION

Typically, an armrest is disposed between the front seats of a vehicle, or between the seat portions of a rear seat, the armrest being, in both cases, hinged by its rear part and extending forward in a cantilever fashion.

In a known manner, such an armrest hinges between at least two positions, one of these being a substantially horizontal lower operational position, and the other a substantially vertical upper folded position, in order to be held therein by locking means, so that, if a user does not wish there to be an armrest, the latter will be disposed in the upper position and will be held therein without any risk of its dropping back down.

Locking means for obtaining this result are known and consist of snap-fastening means acting to provide locking automatically when the armrest is brought to the upper position or to the lower position, but which have to be unlocked manually to change positions.

This amounts to saying that an armrest, once locked in one position or the other, requires action by the user that compels him or her to push a release button and to follow the armrest through to the other position.

It will be readily appreciated that known armrests of this type are of a complex structure bringing into play a large number of parts, thirty or so in all, due, in particular, to the locking mechanism.

BRIEF SUMMARY OF THE INVENTION

The object of the present invention is to remedy the aforementioned drawbacks, and it provides, for this purpose, a folding armrest, in particular for a motor vehicle, of the type that is movable via one of its ends about a hinge, between at least two positions, one of these being a substantially horizontal lower operational position, and the other a substantially vertical upper folded position, in order to be held therein by locking means, characterised in that said locking means are constituted by indexing means integral with one of the fixed or mobile parts of the hinge, in permanent elastic contact with the other part, said other part having at least two notches designed to co-operate with said indexing means so as to give the armrest at least two stable end positions, upper and lower, which can be taken up or left automatically simply by operating said armrest, depending on a predetermined force exerted by a user.

The present invention also relates to the characteristics that will emerge in the course of the following description, and which are to be considered individually or in all their possible technical combinations.

BRIEF DESCRIPTION OF THE DRAWINGS

This description, which is given by way of a non-limitative example, will make it easier to understand how the invention can be put into practice, with reference to the annexed drawings, wherein.

DETAILED DESCRIPTION OF THE INVENTION

Figure 1:
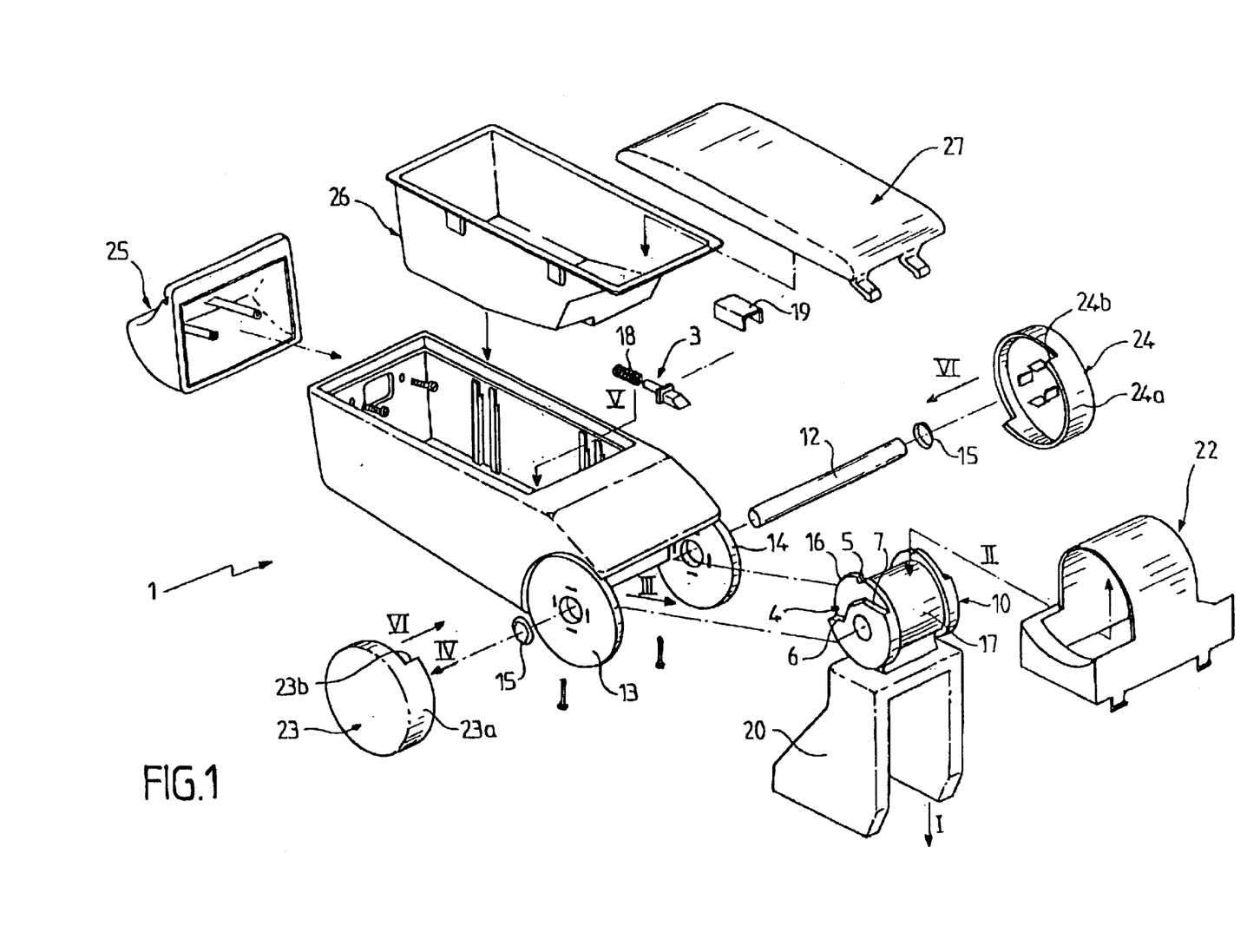
FIG. 1 is an exploded perspective view of a folding armrest according to the invention showing its different stages of assembly.
Figure 2:
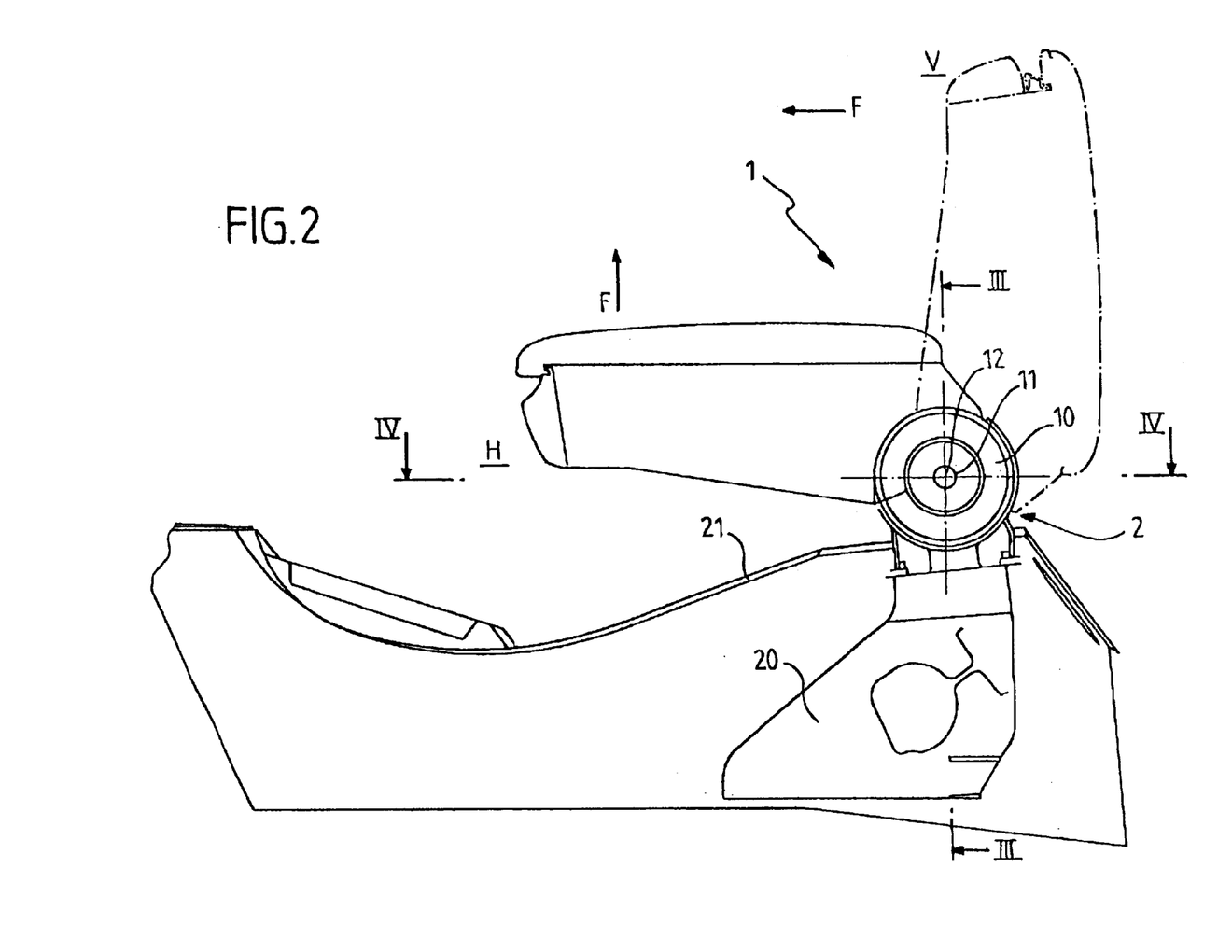
FIG. 2 is schematic side view of an armrest according to FIG. 1 after assembly, in top and in bottom position.
Figure 3:
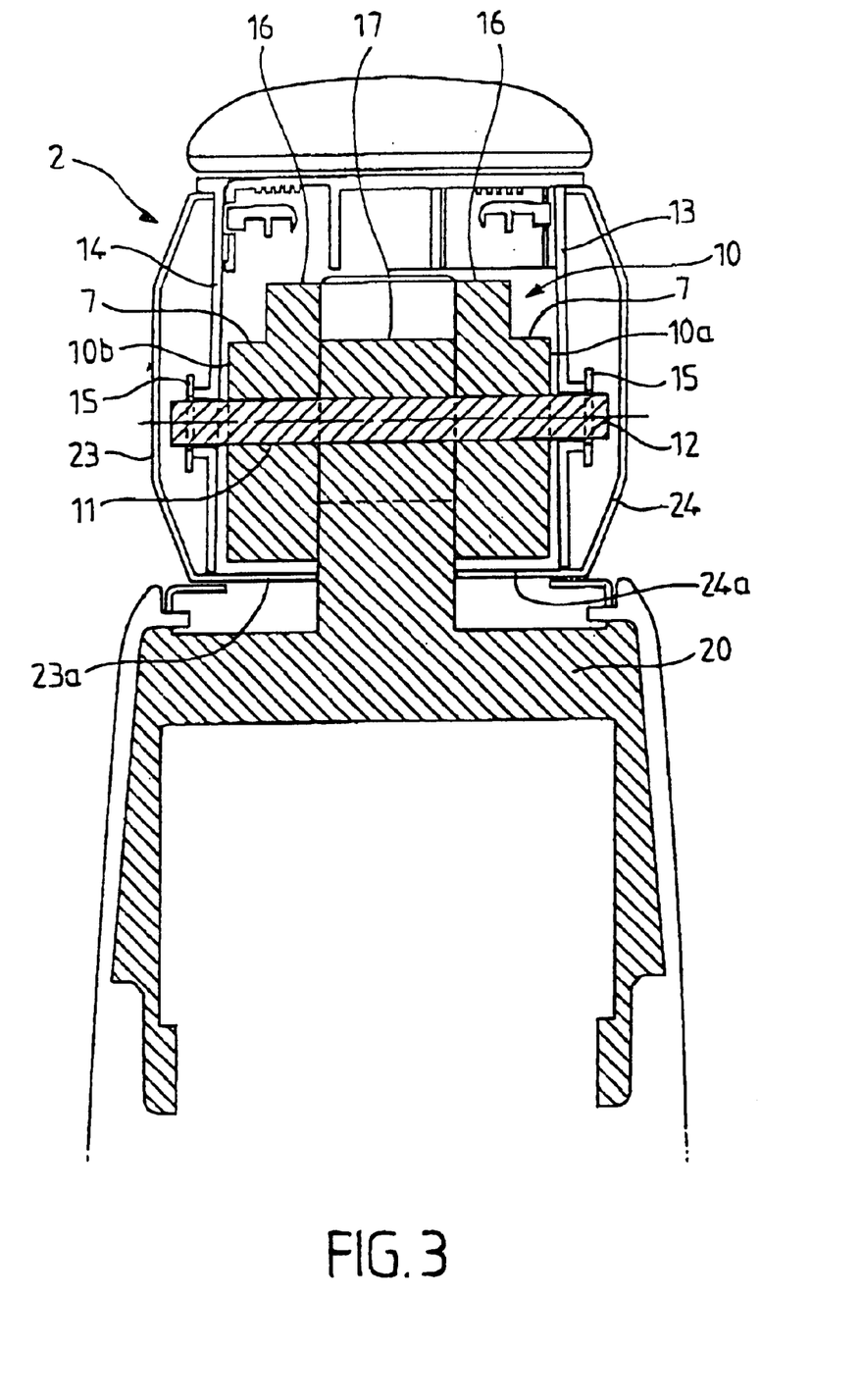
FIG. 3 is a vertical cross-sectional view, in the area of the hinge, along line III—III of FIG. 2.
Figure 4:
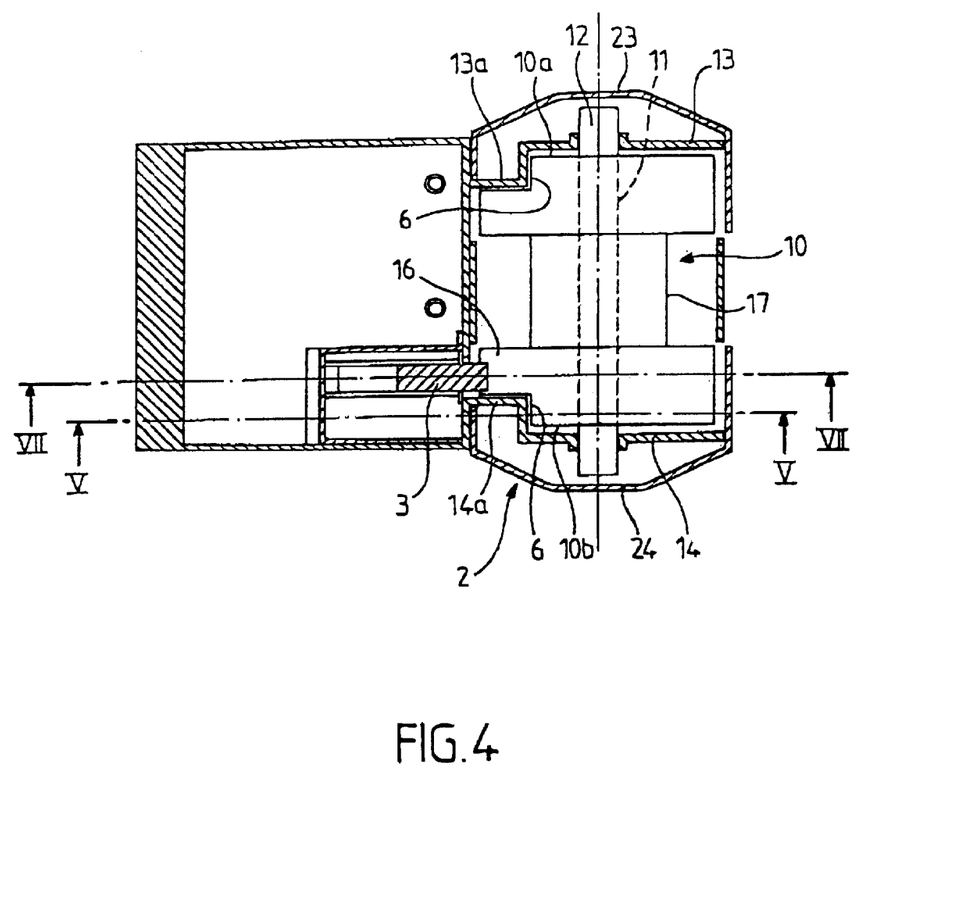
FIG. 4 is a horizontal cross-sectional view in the area of the hinge along line IV—IV of FIG. 2.

As shown in FIG. 1, generally designated folding armrest 1 is movable via one of its ends about a hinge 2, between at least two positions, one of these being a substantially horizontal lower functional position H, and the other an upper folded position, to be maintained therein by locking means.

According to the invention, these locking means are generally constituted by indexing means 3 integral with the mobile part of hinge 2, that is to say with armrest 1. Said indexing means 3 are in permanent elastic contact with, according to the present exemplary embodiment, the fixed part of hinge 2, which has at least two notches, 4 and 5. The latter are designed to co-operate with said indexing means in order to define two stable end positions, an upper position V and a lower position H, which can be taken up or left automatically simply by operating armrest 1, depending on a predetermined force F exerted by a user.

In combination with the aforementioned characteristic, armrest 1 also comprises two effective bearing points 6 and 7, which are provided on the fixed part of hinge 2 and positioned in such a way as to come into contact with corresponding zones 8 and 9 of armrest 1 when the latter is automatically indexed in upper position V or lower position H.

As shown in the figures, the fixed part of hinge 2 is constituted by a horizontal cylindrical pivot member, 10, disposed on a fixed part of the vehicle and comprising an axial bore 11 through which passes a hinge pin 12, with the emerging free ends of which co-operate two flanges 13 and 14 forming bearings integral with armrest 1.

Pivot member 10 comprises, on one hand, indexing notches 4 and 5 and, on the other hand, the two bearing points for upper position V and lower position H.

Flanges 13 and 14 are, in fact, constituted by circular lateral cheeks, the spacing apart of which is substantially identical, allowing for clearance, to the distance between the lateral ends of pivot member 10.

As can be seen in FIG. 1, hinge pin 12 is axially held by clips 15, for example.

Advantageously, and according to one characteristic of the invention, indexing notches 4 and 5 and the two bearing points 6 and 7 are produced in the body of pivot member 10.

More precisely, bearing points 6 and 7 are produced in an axial direction of pivot member 10 from its lateral end planes 10a, 10b, to depths substantially equal to the widths of two corresponding bearing members 13a, 14a, produced on armrest 1 from its flanges 13 and 14.

Figure 5:
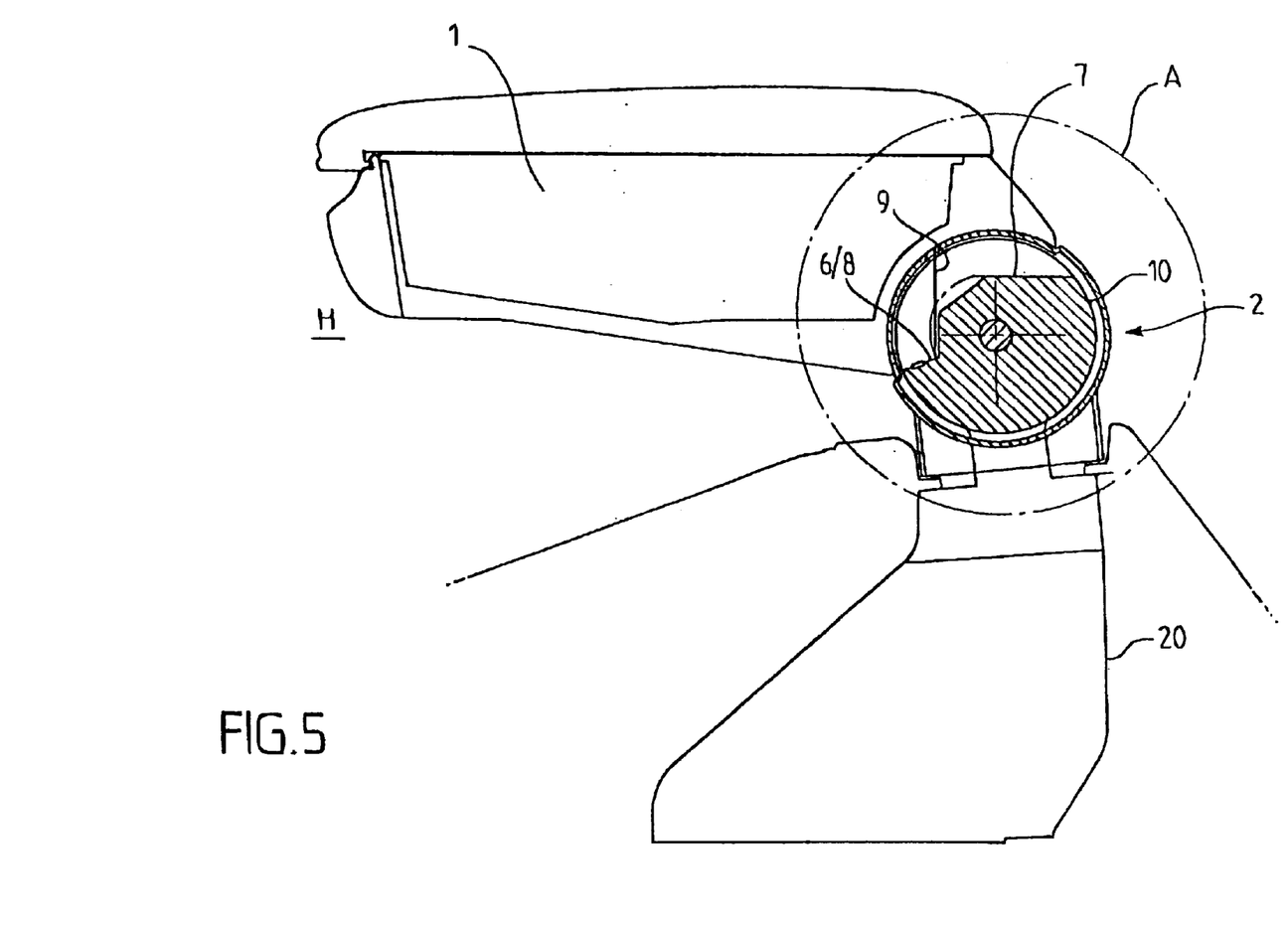
FIG. 5 is a longitudinal cross-sectional view along line V—V of FIG. 4.
Figure 6:
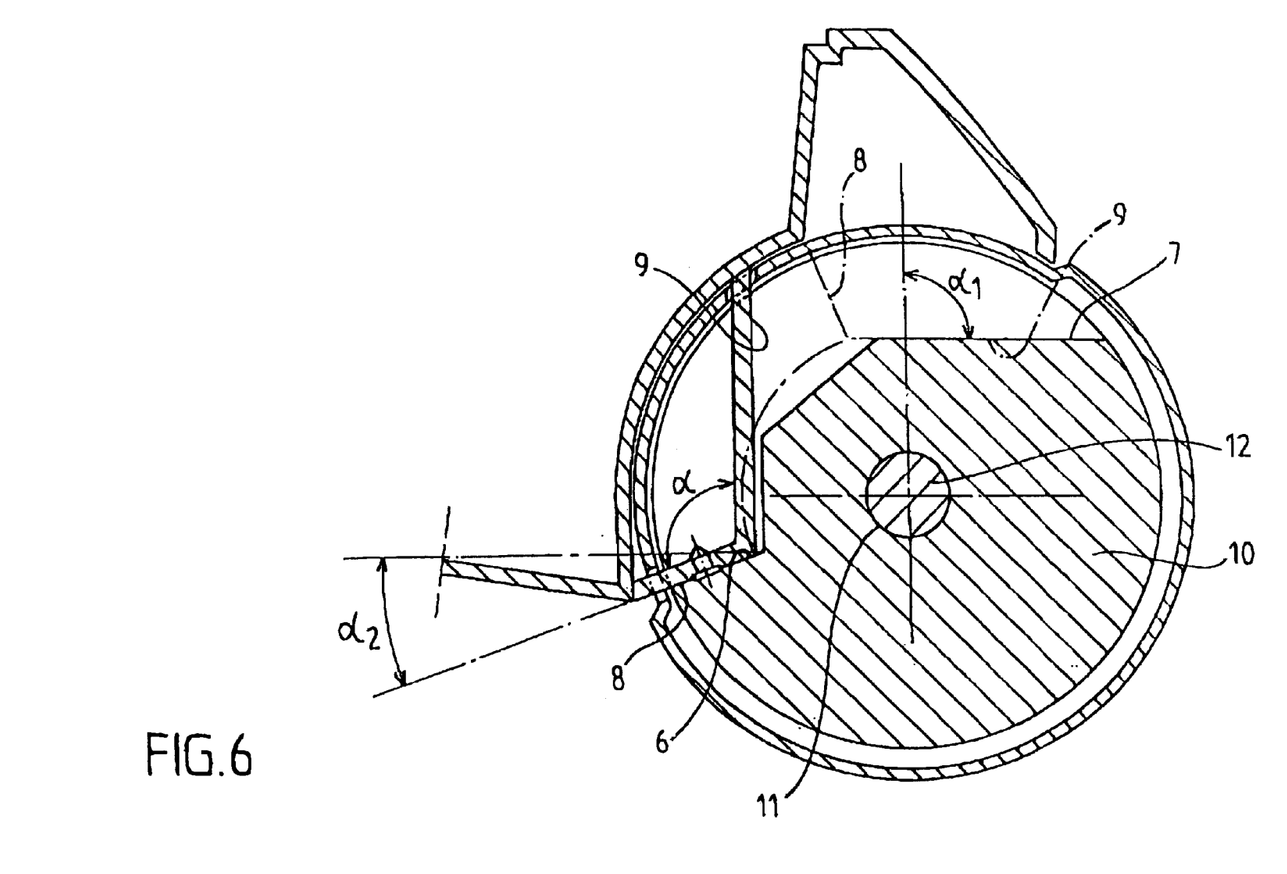
FIGS. 6–8 are cross-sectional views through the armrest in the area of the hinge, in accordance with the present invention.

As particularly clear from FIGS. 5 and 6, bearing points 6 and 7 are provided in two different angular positions in relation to pin 12. These orientations are such as to permit, in the case of armrest 1 pivoting through approximately 90°, on one hand, a substantially vertical upper position V when one of the bearing members 9 of said armrest 1 comes into contact with a corresponding horizontal upper bearing point 7 of pivot member 10, and as to permit, on the other hand, a substantially horizontal lower position H of said armrest 1 when its other bearing member 8 comes into contact with a lower bearing point 6 of pivot member 10. According to the present exemplary embodiment, which is particularly clear from FIG. 6, upper bearing plane 7 of pivot member 10 is horizontal, whereas its lower bearing plane 6 is inclined.

In the same way, bearing plane 9 of the armrest is vertical so as to coincide, after pivoting through 90°, with bearing plane 7 of pivot member 10 and its bearing plane 8 forms an angle identical to that of bearing plane 6 of pivot member 10.

Generally speaking, the two bearing members 8 and 9 of armrest 1 form between them an angle $\alpha$ the value of which is equal to the sum of the angle $\alpha_1$ formed by upper bearing plane 7 of pivot member 10 in relation to a perpendicular line and of the angle $\alpha_2$ formed by lower bearing plane 6 of said pivot member 10 in relation to a horizontal line.

Figure 7:
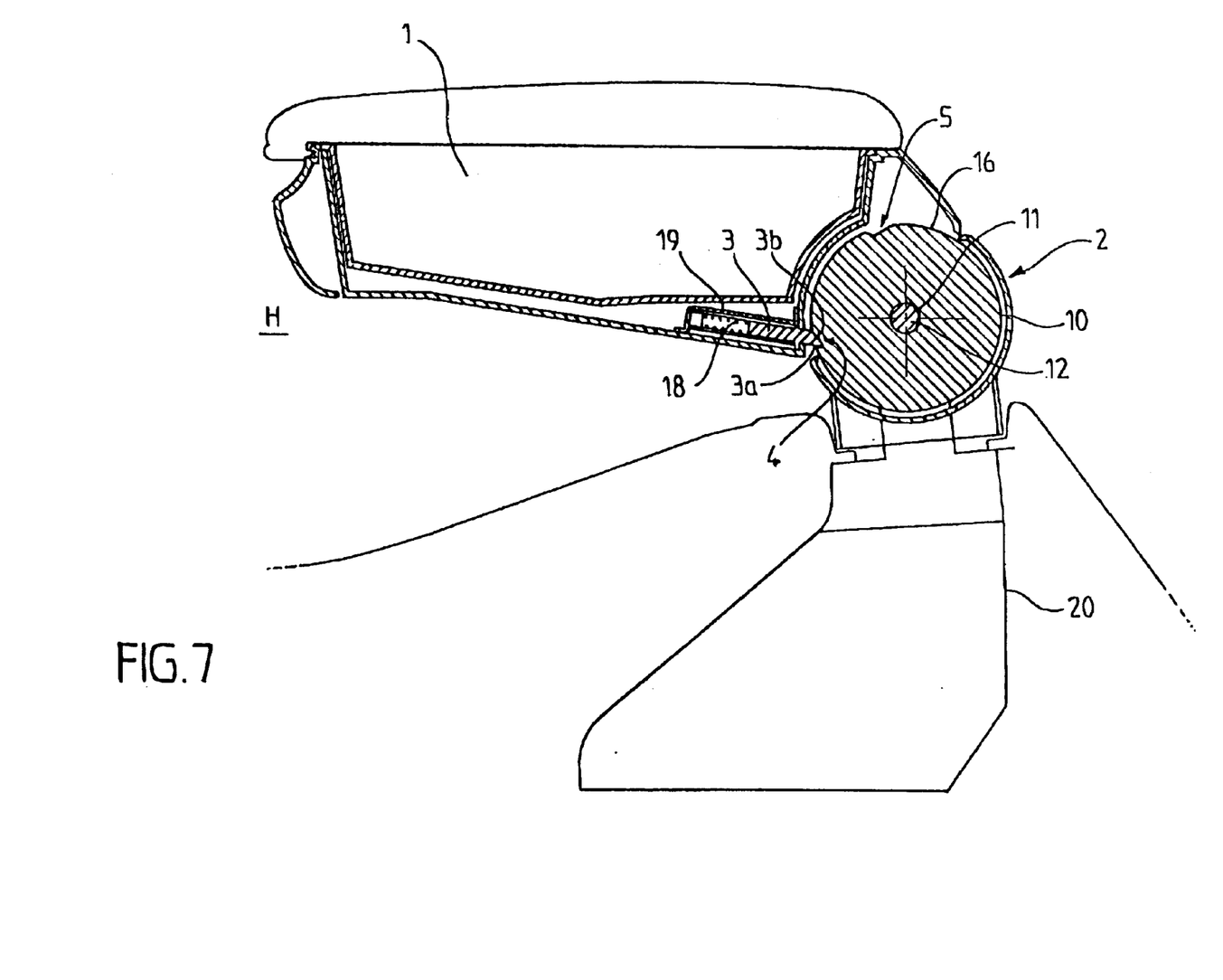
Figure 8:
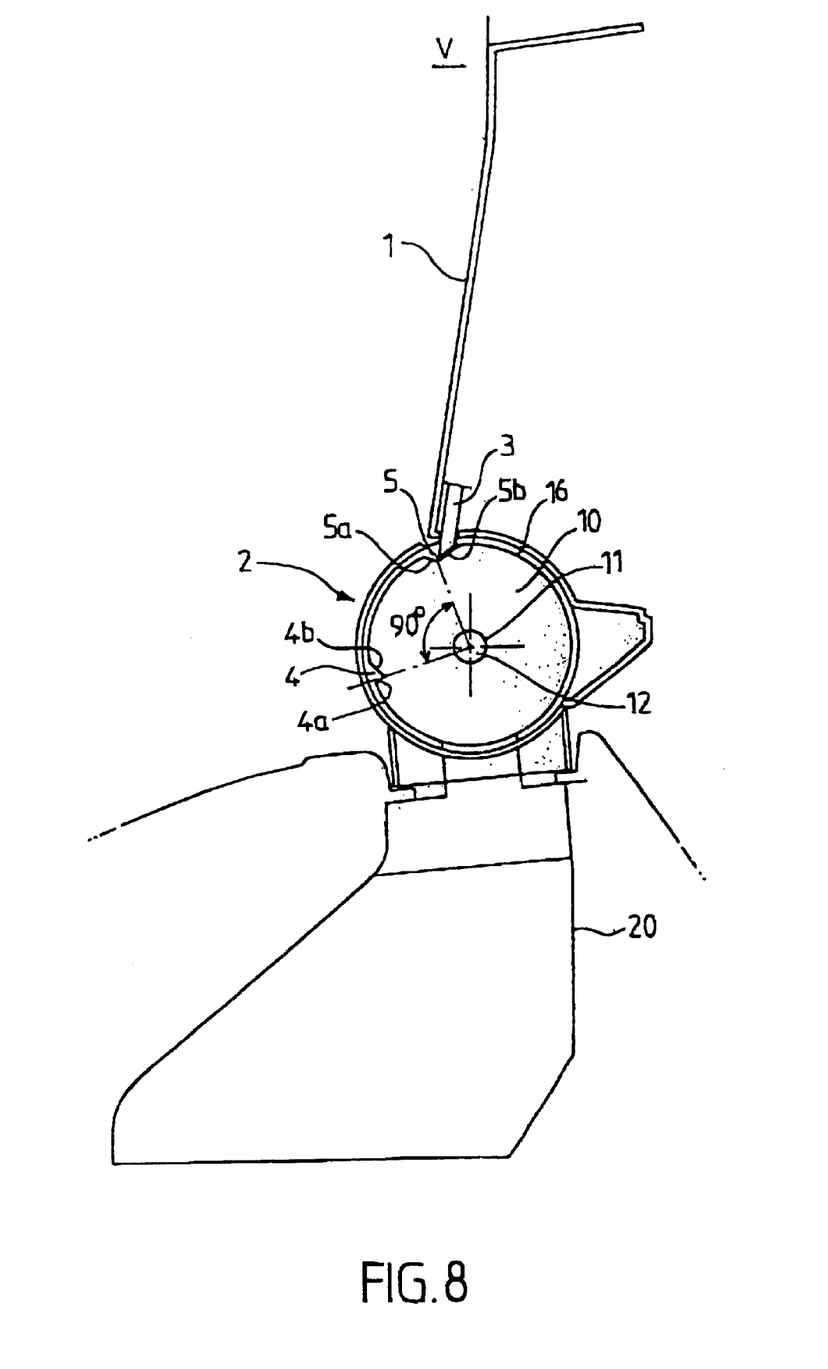

According to another characteristic of the invention, which is particularly clear from FIGS. 7 and 8, indexing notches 4 and 5 corresponding to the upper position V and lower position H of armrest 1 are provided in an axial direction of pivot member 10 on the periphery of the latter on a cheek 16 adjacent to bearing points 6 and 7 corresponding to upper position V and lower position H.

In fact, cheek 16 forms a peripheral crown in relation to a central core which is smaller in diameter.

More precisely, again according to FIGS. 7 and 8, one of lower indexing notches 4 takes the form of a V-shaped notch the aperture angle of which substantially corresponds to that of the end of the mobile indexing means and the orientation of which in relation to the axis of pivot member 10 is such that lower arm 4a of the V of said notch 4 forms in relation to the horizontal an angle enabling it to constitute a plane of abutment with a lower zone 3a of the end of indexing means 3, when armrest 1 is returned to lower position H, while its other arm, 4b, forms an angle in relation to the vertical such as to constitute a ramp to be cleared by upper zone 3b of the end of indexing means 3 at the time of a return to an upper position V. This is accomplished with elastic compression of a return member 18, corresponding to a predetermined force to be applied to armrest 1 by a user.

On the other hand, the other, upper, notch 5 takes the form of a notch likewise V-shaped but the aperture angle of which is larger than that of the end of mobile indexing means 3; its orientation in relation to the axis of pivot member 10 is such that arm 5a forms an angle in relation to the horizontal enabling it to constitute a ramp to be cleared by indexing means 3 with elastic compression of their return member 18, corresponding to a predetermined force to be applied to armrest 1 by a user.

In fact, in the case of this second vertical position, arm 5a of the V forming upper notch 5 must not be orientated angularly to form an abutment for the end of mobile indexing member 3 as in the case of lower notch 4.

According to the present exemplary embodiment, mobile indexing means 3 are constituted by a slide mounted for translation in a corresponding blind type housing 19 provided in a lower part of armrest 1 and at the end of which is disposed elastic return member 18.

Housing 19 for slide 3, when armrest 1 is in the lower position, is directed downwards in relation to a horizontal line at a predetermined angle, in such a way that said slide comes to bear when it is inside corresponding lower notch 4 of pivot member 10.

This makes it possible to constitute an abutment in addition to the one already constituted by bearing point 6 of pivot member 10.

According to another characteristic of the invention, pivot member 10 is disposed on a fixed part of the vehicle via a yoke 20 with the upper part of which it is integral, said yoke 20 being covered upon assembly by a fixed base 21 of armrest 1 in which is provided an opening from which emerges pivot member 10, the core 17 of which is axially surmounted by a cover 22 removably fixed to fixed base 21 of armrest 1 and the lateral end openings of which are closed by flanges 13 and 14 of armrest 1, at the time of assembly. Said yoke 20 and said pivot member 10 can, as applicable, be made in one piece.

According to another characteristic of the invention, covering plugs 23 and 24 are fixedly mounted on flanges 13 and 14 of armrest 1, after the latter has been mounted on pivot member 10, each of them having a peripheral collar 23a, 24a extending axially so as to cover at least said flanges 13 and 14. Said covering plugs can further cover, via a partial axial prolongation of said collar, the lateral ends 10a, 10b of pivot member 10 on which are provided, on one hand, bearing planes 6 and 7 and, on the other hand, indexing notches 4 and 5, at least in part.

The hinge mechanism and, in particular, indexing means 3, are thus invisible to the users, this being so even during the movements of the armrest, through the co-operation of said cover 22, plugs 23, 24 and the faces of the armrest opposite which they are provided, while, at the same time, permitting freedom of movement of said fixing means against the fixed part of said armrest.

So as to adapt to the conformation of flanges 13 and 14 in relation to the lateral walls of armrest 1 from which they originate, covering plugs 23 and 24 have a peripheral cut-out portion, 23b and 24b, complementary to said axial prolongation of the collar.

Said armrest can further have, as applicable, a gripping handle 25 for operation, at its end opposite from hinge 2, as well as an internal storage tray, accessible via a pivoting cover plate 27. Storage tray 26 is, for example, removable in relation to the remainder of said armrest.

The process for assembling an armrest as just described is carried out observing the following steps:

installing yoke 20 of pivot member 10 on a fixed part of the vehicle (stage 1);
installing fixed base 21 of armrest 1 by passing through pivot member 10 (stage not shown);
installing cover 22 of pivot member 10 (stage 2);
placing flanges 13 and 14 of armrest 1 on the lateral ends of pivot member 10 (stage 3);
installing pivot pin 12 and its fixing clips 15 (stage 4);
installing indexing member 3 (stage 5);
installing cover plugs 23 and 24 (stage 6).

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims

What is claimed is:
1. A folding armrest for a motor vehicle, the armrest comprising:

a hinge having a mobile part and a fixed part, wherein the armrest moves about the hinge from a substantially horizontal position H to a substantially vertical position V;

a locking means having an indexing means, wherein the indexing means is integral with the mobile part and in permanent elastic contact with the fixed part;

a pivot member disposed on the fixed part, wherein the pivot member comprises a lower indexing notch, an upper indexing notch, an upper bearing and a lower bearing, wherein the upper bearing and the lower bearing cooperate with corresponding bearing areas on the mobile part, such that the upper bearing and lower bearing of the armrest form an angle between them, wherein the angle α is equal to the sum of an angle formed by the upper bearing in relation to a perpendicular line and of an angle formed by the lower bearing in relation to a horizontal line.

2. The armrest according to claim 1, wherein the lower indexing notch and the upper indexing notch cooperate with the indexing means to hold the armrest in the horizontal or vertical position.

3. The armrest according to claim 2, wherein the pivot member comprises an axial bore having a hinge pin passing through the axial bore, wherein the hinge pin cooperates with two flanges formed on the armrest.

4. The armrest according to claim 3, wherein the bearings are in angular orientation with respect to the pin such that when the armrest is in the vertical position V the upper bearing is in contact with the corresponding bearing area and when the armrest is in horizontal position H the lower bearing is in contact with the corresponding bearing area to allow the armrest to pivot approximately 90°.

5. The armrest according to claim 1, wherein the upper indexing notch and the lower indexing notch are on a periphery of the pivot member of a cheek adjacent the upper bearing and the lower bearing.

6. The armrest according to claim 1, wherein the lower indexing notch is a V-shaped notch, an aperture angle of which substantially corresponds to an end of the indexing means and the orientation of which in relation to the axis of the pivot member is such that a lower arm of the V of the V-shaped notch forms an angle in relation to the horizontal line enabling it to constitute a plane of abutment with a lower zone of the end of the indexing means, when the armrest is returned to horizontal position H, wherein an upper arm of the V of the V-shaped notch forms an angle in relation to the vertical line, to constitute a ramp to be cleared by an upper zone of the indexing means at the time of its return to an upper position V with elastic compression of a return member, corresponding to a predetermined force to be applied to the armrest by a user, an aperture of the upper notch angle which is larger than the end of the indexing means, its orientation in relation to the axis of the pivot member being such that an arm of a V located towards the lower notch forms an angle in relation to the horizontal line enabling it to constitute a ramp to be cleared by indexing means with elastic compression of their return member, corresponding to a predetermined force F to be applied to armrest by a user.

7. The armrest according to claim 1, wherein the indexing means is constituted by a slide mounted for translation in a corresponding blind type housing provided in a lower part of the armrest at the end of which is disposed an elastic return member.

8. The armrest according to claim 7, wherein the housing for the slide is in the horizontal position, directed downwards in relation to a horizontal line at a predetermined angle, in such a way that said slide comes to bear when it is in the corresponding lower indexing notch of the pivot member.

9. The armrest according to claim 1, wherein the pivot member is attached to a fixed part of the motor vehicle via a yoke wherein the yoke is covered by a fixed base having an opening for the pivot member, a core of the pivot member is axially surmounted by a cover, wherein the cover is removably fixed to the fixed base.

10. The armrest according to claim 9, further comprises a plurality of covering plugs fixedly mounted on flanges of the armrest, wherein the plurality of covering plugs have a peripheral collar extending axially so as to cover the flanges, the collar having a partial axial prolongation to cover.

* * * * *